United States Patent
Taylor (10) Patent No.: US 9,410,708 B2
(45) Date of Patent: Aug. 9, 2016

(54) METHOD AND APPARATUS FOR AUTOMATIC DESCALING OF TANKLESS WATER HEATERS

(71) Applicant: Jon R. Taylor, Indianapolis, IN (US)

(72) Inventor: Jon R. Taylor, Indianapolis, IN (US)

( * ) Notice: Subject to any disclaimer, the term of this patent is extended or adjusted under 35 U.S.C. 154(b) by 499 days.

(21) Appl. No.: 13/694,764

(22) Filed: Jan. 2, 2013

(65) Prior Publication Data

US 2014/0182624 A1 Jul. 3, 2014

(51) Int. Cl.
*B08B 3/00* (2006.01)
*F24D 19/00* (2006.01)
*F28G 9/00* (2006.01)

(52) U.S. Cl.
CPC .............. *F24D 19/0092* (2013.01); *F28G 9/00* (2013.01); *C02F 2303/22* (2013.01)

(58) Field of Classification Search
None
See application file for complete search history.

(56) References Cited

U.S. PATENT DOCUMENTS

| 6,161,558 A | * | 12/2000 | Franks | B08B 9/0321 |
| | | | | 134/103.1 |
| 6,595,222 B2 | * | 7/2003 | Simpson | C23G 3/023 |
| | | | | 134/57 R |

* cited by examiner

*Primary Examiner* — Eric Golightly
(74) *Attorney, Agent, or Firm* — Ice Miller LLP (57) ABSTRACT

A system for descaling a water heating unit, said system comprising (so that the abstract is directed to the presently allowed apparatus, rather than a method): a pump; a descaling solution source; a plurality of valves; a programmable control module operatively coupled to said pump, said descaling solution source, and said valves, said programmable control module adapted to selectively receive a user-defined descaling operation start date and time, monitor for the advent of a descaling operation start date and time, and upon the advent of the descaling operation start date and time, automatically shut off via at least one valve, a supply of heated water, and automatically activate said pump; said pump adapted to automatically pump stored descaling solution, and further adapted to automatically rinse a water heating unit; and said programmable control module further adapted to cause said valves to discharge solution from said water heating unit, restore a supply of heated water, and return said water heating unit to normal operation mode.

14 Claims, 6 Drawing Sheets

METHOD AND APPARATUS FOR AUTOMATIC DESCALING OF TANKLESS WATER HEATERS

CROSS-REFERENCE TO RELATED APPLICATIONS

This application is based on and claims the priority of U.S. Provisional Patent Application Ser. No. 61/585,956, filed Jan. 12, 2012 for "Method and Device for Automatic Descaling of Tankless Water Heaters."

BACKGROUND OF THE INVENTION

1. Field of the Invention

The present invention generally relates to the field of water heaters and water heating systems, with emphasis on the tankless variety, and particularly relates to the maintenance of said heaters and systems.

2. Background

Tankless or on-demand water heaters are rapid-response water heaters that represent advances over conventional "tank" water heaters, including energy and space savings.

Figure 1:
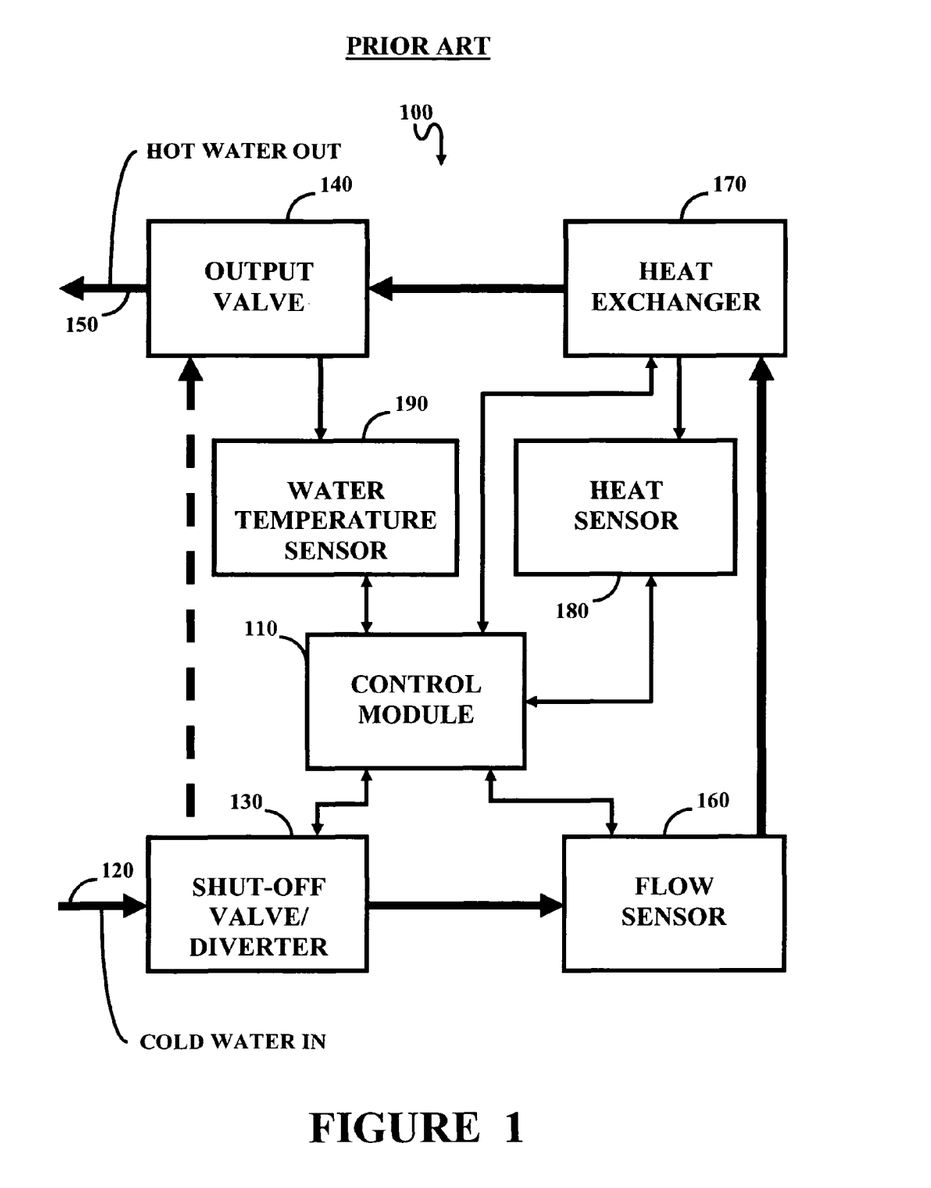
FIG. 1 is a schematic diagram of a prior art tankless water heater unit.

The major components of a conventional tankless water heater are illustrated with reference to FIG. 1. In the tankless water heater 100, a control module serves to electronically control the operation of the unit. Tankless water heaters have similar make-up whether they are larger units designed to supply hot water to an entire structure such as a home or other building, or whether they are smaller units designed to supply hot water to a limited area such as an individual sink or bathroom shower.

In operation, cold, potable water enters the unit 100 via an input 120 to a valve 130, which may optionally contain an emergency shut-off and diverter feature to divert water from the unit if the unit is in a "lock-out" condition. The "lock-out" condition shuts the unit down to protect it from highly inefficient or unsafe operating conditions. Without diversion of the water source, water from the "hot water" designated piping will not flow in the structure.

A flow sensor 160 senses the flow of water coursing through the supply line (i.e., a demand for hot water has been triggered by turning on a hot water faucet or the like) and sends a signal to the control module 110. In response, the control module 110 activates a heat exchanger 170 for rapid heating of the water, whereupon the heated water exits the unit 100 via an output valve 140 and output 150 (toward the hot water demand site in the structure). A heat sensor 180 monitors the heat exchanger temperature and a water temperature sensor temperature of the water leaving the unit.

If the heat exchanger 170 overheats, the control module 110 causes it to shutdown. Large discrepancies between the heat exchanger temperature and the water temperature immediately leaving the heat exchanger can also indicate inefficient or unsafe operating conditions. Either may cause a "lock-out" condition, which will typically also send a visible error signal viewable via a control panel display (not shown).

"Hard" water (or mineral-rich water) poses challenges to the efficient and safe operation of hot water heaters, as mineral deposits, often in the form of calcium or lime scale build-up attach to both heating surfaces and conduits. And while the greater movement of water in the aggregate of tankless water heaters may lead to a reduction of scale build-up, compared to convention tank units, scale build-up is nonetheless a problem. Scale deposit build-up is observed in tankless water heater units over time even where "softer" potable water is used. Therefore, tankless water heater units need to be periodically descaled for efficient and safe operation. Because of their higher initial costs, it is not economical to discard tankless water heaters with the same frequency as lower-cost tank heaters when scale build-up occurs.

The primary prior art approach to descaling tankless water heaters, is a manually one where a service person decouples the unit from the supply and output lines and forces a descaling cleaning solution through the tankless unit conduits to remove the scale build-up. The cleaning solution and any scale build-up collected in the process are purged from the system. The process is repeated as needed. Unfortunately for tankless water heater unit owners, the manual descaling process can be expensive (for labor costs and the costs attributable to a portion of expensive, special-purpose descaling equipment) and inconvenient, as well as disruptive of hot water peak demand time.

The other prior approach is to install scale inhibition filters that reduce scale build-up. However, this only delays the inevitable by relative slight times, and can be costly over time as well.

The typical tankless water heater unit requires thorough descaling once or twice a year. Thus, there is a long-standing, but unmet and unsolved need to provide tankless water heaters and tankless water heating systems that do not require labor-intensive descaling, as the prior art uniformly teaches and suggests labor-intensive descaling approaches. There is also a long-standing, but unmet and unsolved need to meaningfully reduce descaling costs over the life of tankless water heaters and tankless water heating systems.

SUMMARY OF THE INVENTION

In response to the long-felt, but unsolved and unmet needs of the prior art the present invention provides a novel method of descaling a water heating unit, the water heating unit being adapted to receive unheated, potable water via a cold-side input, and adapted to output heated water to the demand destination via a hot-side output. The method at least includes: a) operating a water heating unit in a normal mode as a default; b) via a programmable control module, selectively receiving a user-defined descaling operation start date and time; c) via the programmable control module, monitoring for the advent of the descaling operation start date and time; d) via the programmable control module, and upon the arrival of the descaling operation start date and time, automatically shutting off the supply of heated water to the demand destination, and automatically activating a pump; e) via said pump, automatically pumping a stored descaling solution through said water heating unit via said cold-side input of said water heating unit and said hot-side output of said water heating unit to dislodge scale deposits from said water heating unit; f) via said pump, automatically rinsing said water heating unit to remove dislodged scale deposits and to remove descaling solution; g) discharging dislodged scale deposits and descaling solution from said water heating unit; h) restoring the supply of heated water to the demand destination; and i) returning the water heating unit to normal operation mode.

The present invention also provides a novel system for descaling a water heating unit, said water heating unit being adapted to receive unheated, potable water via a cold-side input, and adapted to output heated water to the demand destination via a hot-side output, which water heating unit operates in a normal mode as a default. The system at least includes: a pump; a descaling solution source; a plurality of valves; a programmable control module operatively coupled to said pump, said descaling solution source, and said valves, said programmable control module adapted to selectively receive a user-defined descaling operation start date and time, monitor for the advent of the descaling operation start date and time, and upon the arrival of the descaling operation start date and time, automatically shut off via at least one valve, the supply of heated water to the demand destination, and automatically activate said pump; said pump adapted to automatically pump stored descaling solution through said water heating unit via said cold-side input of said water heating unit and said hot-side output of said water heating unit to dislodge scale deposits from said water heating unit, and further adapted to automatically rinse said water heating unit to remove dislodged scale deposits and to remove descaling solution; and said programmable control module further adapted to cause said valves to discharge dislodged scale deposits and descaling solution from said water heating unit, restore the supply of heated water to the demand destination, and return said water heating unit to normal operation mode.

BRIEF DESCRIPTION OF THE DRAWING FIGURES

Features and advantages of the present invention will become apparent to those skilled in the art from the description below, with reference to the following drawing figures, in which.

DESCRIPTION OF THE PREFERRED EMBODIMENTS

Figure 2:
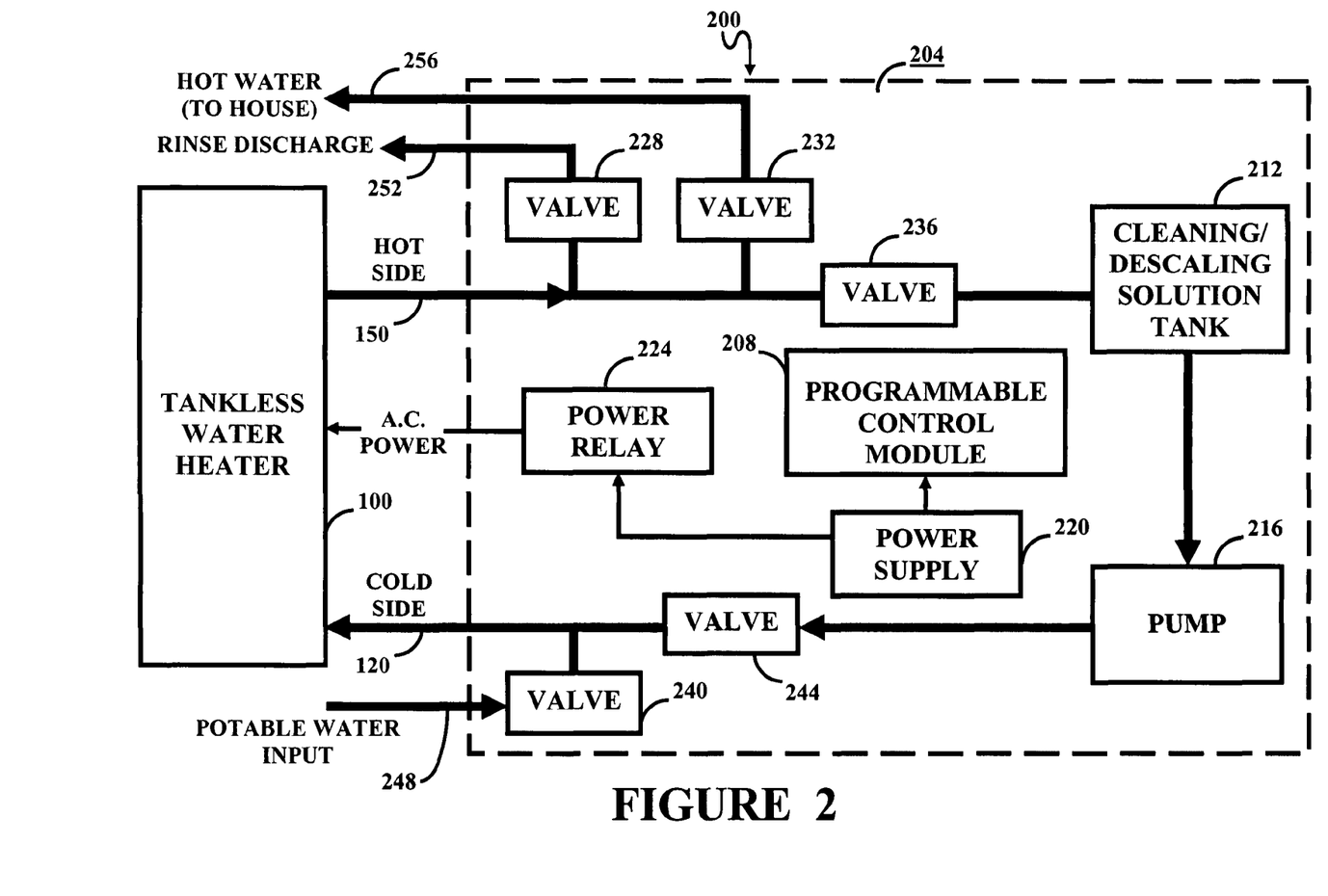
FIG. 2 is a general schematic diagram of the present-inventive automatic water heater descaling system and apparatus.

FIG. 2 illustrates the general architecture of the preferred embodiment of the present-inventive system 200 capable of implementing the present-inventive method for automatically descaling a water heating unit—in this case a tankless (or on-demand) water heating unit 100. An automatic descaler 204 directly carries out the descaling and rinsing operations with respect to the water heater 100. As will be described below, the system 100 novelly monitors for a triggering date and time which the user may program to trigger an automated descaling operation to descale (i.e., remove scale deposits from the conduits, including the heat exchanger) the water heater 100. In the preferred embodiment, the descaling operation is followed by an automated rinsing operation for rinsing away dislodged scale deposits along with the descaling solution and any other by-products of chemical reactions during the descaling process. While the descaling and rinsing operations occur, the water heater is automatically decoupled from the hot water supply line to the structure. Likewise, when the descaling and rinsing operations are complete, the water heater is re-coupled to the hot water supply line to supply heated, potable water to the structure. The automatic descaler 204 and water heating unit 100 are supplied with alternating current (A.C.) power as will be appreciated by those skilled in the art.

The automatic descaler 204 can be constructed as a stand-alone unit for directly coupling to the water heater inputs and outputs. Alternatively, systems 200 can be manufactured as one unit that includes both the automatic descaler and the water heater.

The heart of the automated processes and the automatic descaler 204 is a programmable control module 208, which both receives programmable data from a user who enters a desired date and time for a future or future descaling operations to occur, and monitors and directs the automated descaling and rinsing processes. Those skilled in the art will appreciate that given the present description, the programmable control module may take many forms, including a more generally programmable computing device at the high end, and a state machine on the low end. All of the major conduits appear as thick solid lines in FIG. 2 for illustrative purposes. In subsequent drawing figures, solid conduit lines represent open conduits that allow flow, while dotted conduit lines represent closed conduits that do not allow flow.

The other major components of the automatic descaler 204 are a cleaning/descaling solution tank 212 for storing and then delivering a cleaning/descaling solution during a cleaning/descaling operation, a pump 216 for pumping cleaning/descaling solution to and through the water heater during a cleaning/descaling operation, a power supply 220 for supplying appropriate types and levels of electrical power to the elements of the automatic descaler 204, and several solenoid-triggered valves 228, 232, 236, 240 and 244, for directing the flow of potable water and cleaning/descaling solution, from, through and away from the water heater during normal operation, and during cleaning/descaling and rinsing operations. A power relay 224 coupled to the power supply 220 and the valves (connections not shown) triggered by the programmable control module 208, sends power to the valve solenoids to energize the solenoids (and thus open a normally closed valve, or close a normally open valve) during cleaning/descaling and rinsing operations.

The automatic descaler 204 connects to the cold side 120 and hot side 150 of the tankless water heater 100. The additional major components of the system 200 include a potable water input 248 for receiving potable water to be heated and supplied to the structure, a rinse discharge output 252 for outputting discharged scaling deposits, descaling solution, and rinsing water during an automated rinse operation, and a hot water output 256 for outputting heated, potable water to target structure (i.e., house or building).

Figure 3:
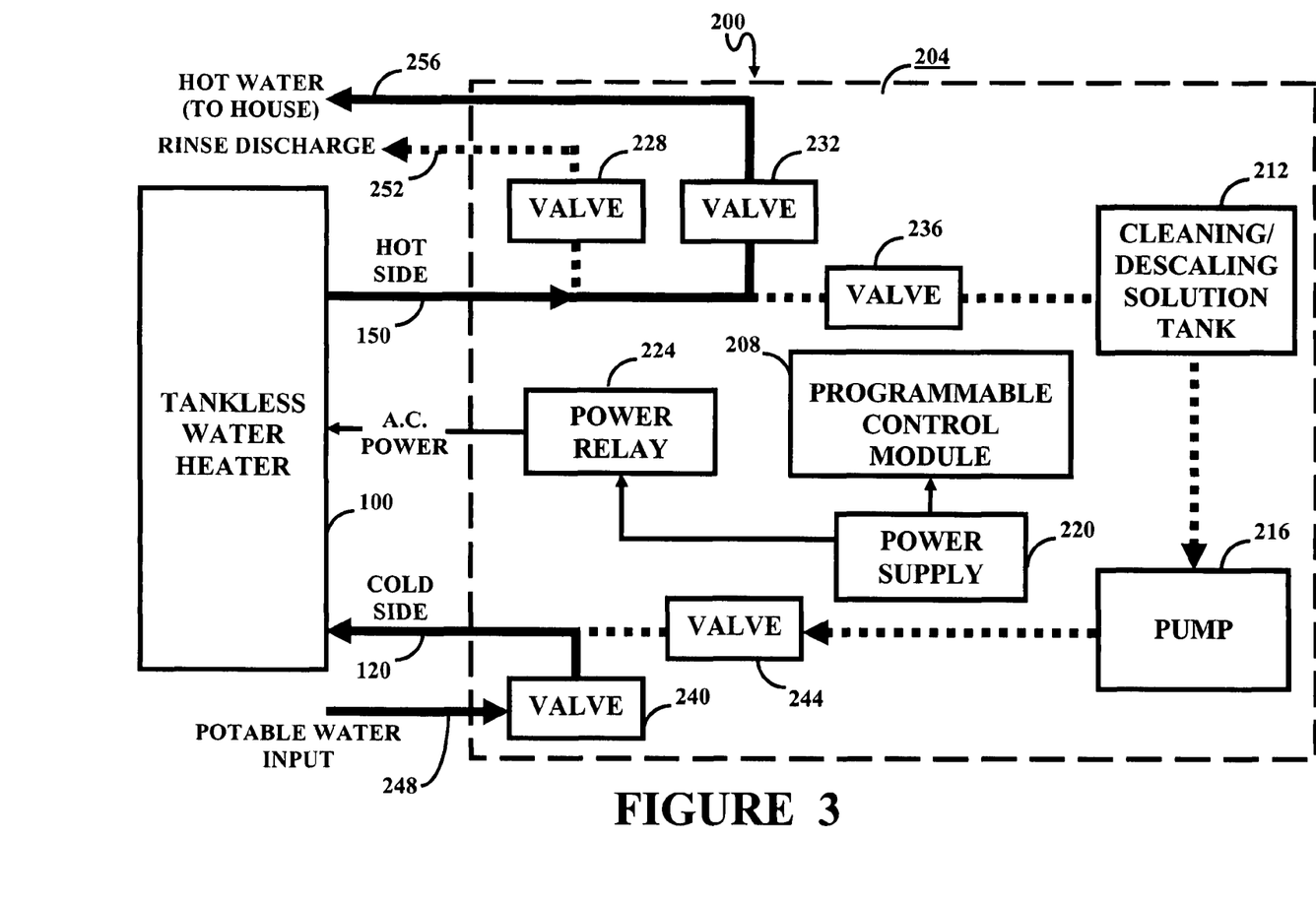
FIG. 3 is a schematic diagram of the present-inventive automatic water heater descaling system and apparatus showing the state of the conduits (solid lines for open; dotted lines for closed) when the tankless unit is operating in the normal mode.

FIG. 3 illustrates the state of the automatic descaler 204 during the normal operation of the water heater 100. In the normal mode of operation of the water heater 100, the automatic descaler 204 effectively acts as a pass-through valve that passes unheated potable water directly to the water heater 100 to be heated, and passes heated, potable water directly from the water heater 100 to the structure or targeted location in the structure. In their default states, which correspond to the normal mode of operation of the water heater, valves 232 and 240 are normally open, while valves 228, 236, and 244 are normally closed. The programmable control module 208 continues to monitor for the date and time designated for a scheduled cleaning/descaling operation.

Figure 4:
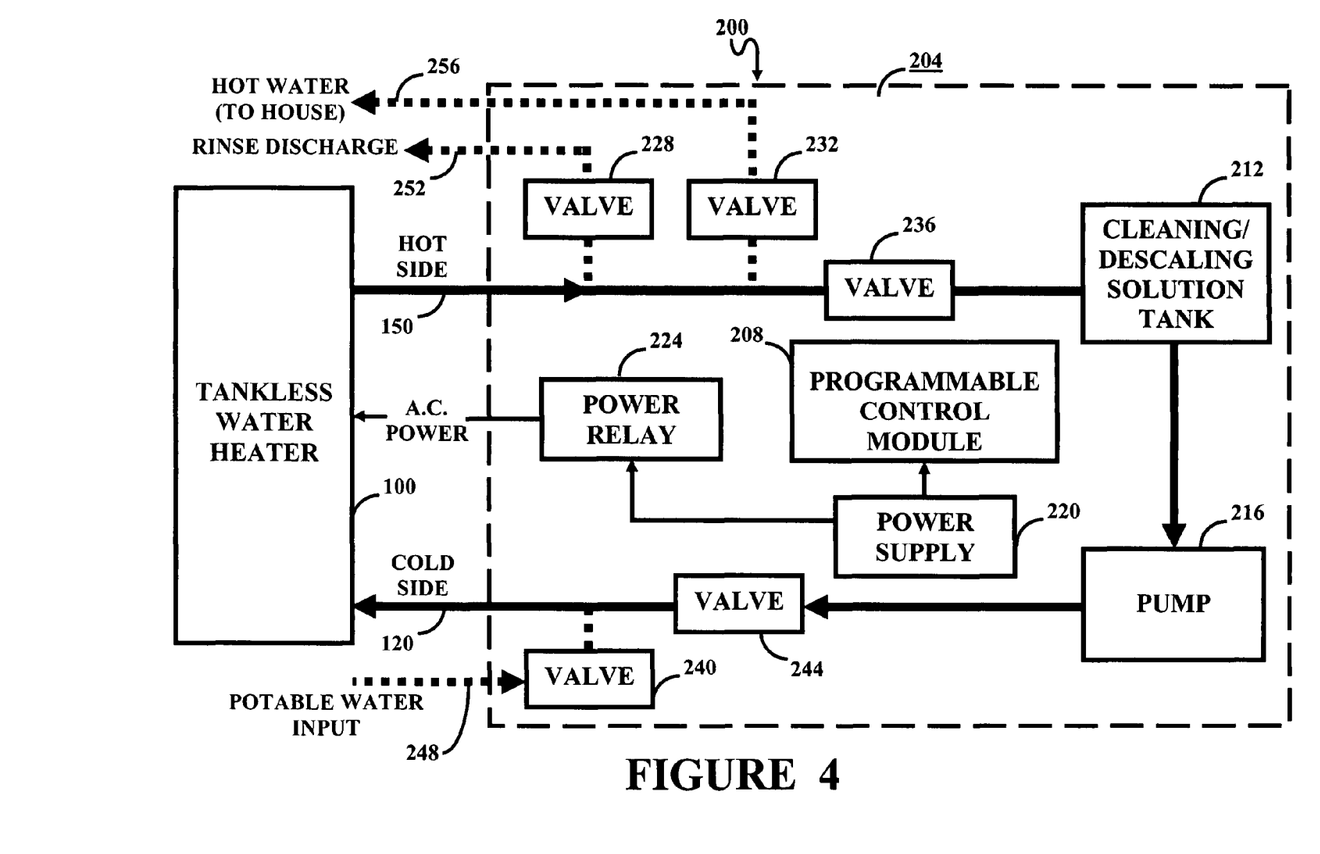
FIG. 4 is a schematic diagram of the present-inventive automatic water heater descaling system and apparatus of FIG. 3, showing the state of the conduits (solid lines for open; dotted lines for closed) during cleaning mode when the tankless unit is undergoing descaling.

When the programmable control module 208 detects the date and time for a scheduled descaling operation, it causes the appropriate solenoids to change the states of their associated valves as needed, and as shown in FIG. 4. The water heater 100 is taken off-line (from the structure supply line) during the cleaning/descaling and rinse operations. The AC power supplied to the water heater via the power relay 224 during normal operation mode is also removed. In particular, during cleaning/descaling mode, normally open valves 240 and 228 leading to the potable water input 248 and hot water output 256, respectively, are automatically closed. Normally closed valves 236 and 244 are energized to open, while valve 228 remains closed. By these actions a closed fluid circuit is formed between the water heater 100, the cleaning/descaling solution tank 21, and the pump 216 during cleaning/descaling mode.

During the cleaning/descaling mode the pump 216 circulates cleaning/descaling solution from the cleaning/descaling solution tank 212 through the water heater 100 for a predetermined time to remove scale deposits from the fluid conduits of the water heater. The cleaning/descaling operation may last for a default length of time (e.g., 20 minutes) or other length of time programmable by the user. While the system 200 is in cleaning/descaling mode, the programmable control module 208 monitors for the scheduled onset of the rinsing mode/cycle.

Figure 5:
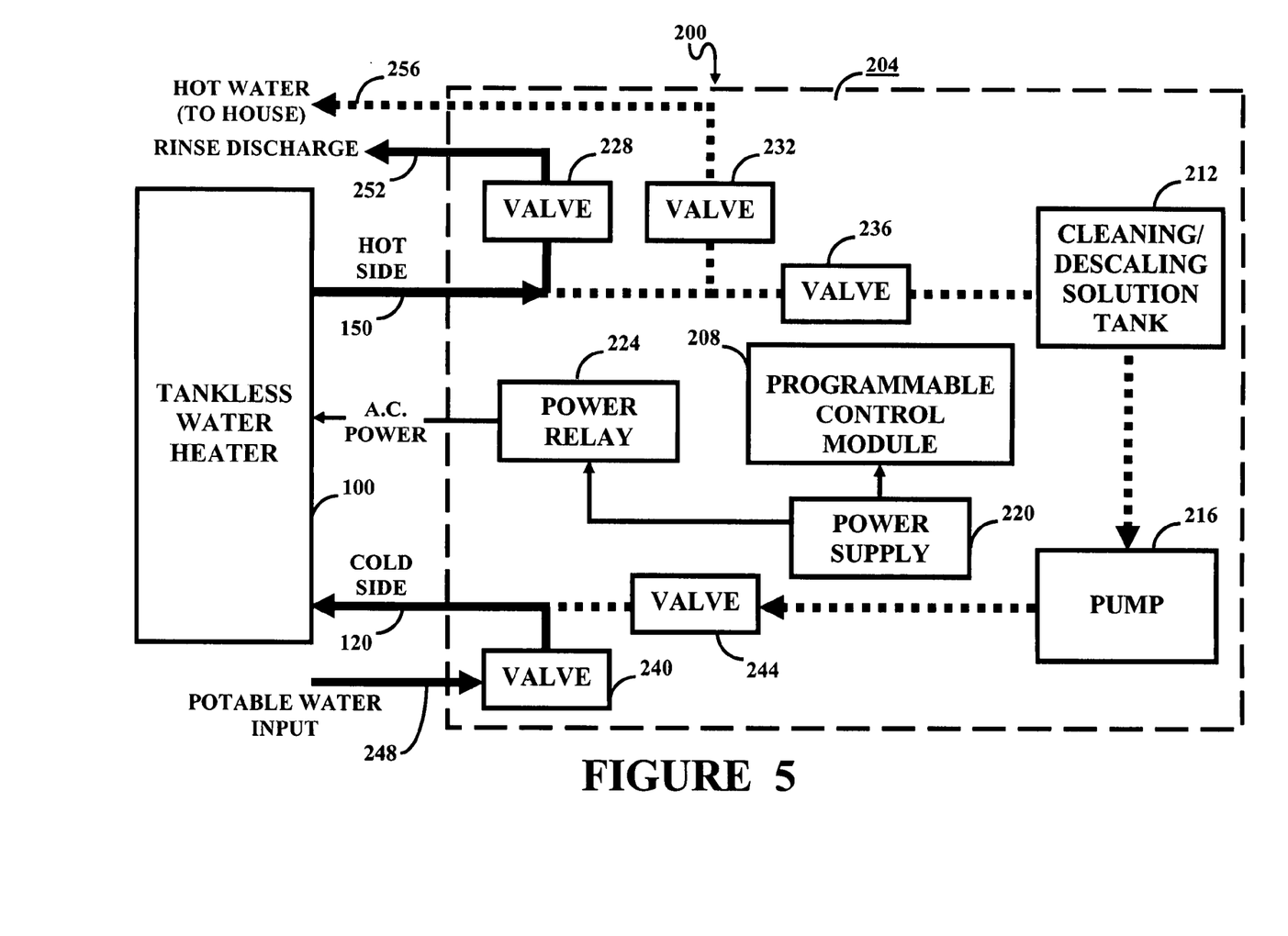
FIG. 5 is a schematic diagram of the present-inventive automatic water heater descaling system and apparatus of FIG. 3, showing the state of the conduits (solid lines for open; dotted lines for closed) during rinse mode when the tankless unit is undergoing rinsing after descaling.

When the rinsing mode is triggered, the state of the conduits is as shown in FIG. 5. The hot water heater remains off-line to the structure (valve 232 remains closed), but the cold side 120 receives potable water via the newly opened valve 240. Previously open valves 236 and 244 are closed to move the pump 216 and tank 212 off-line. The pressured potable water rinses the conduits of the water heater 100, while a newly opened rinse discharge vale 228 discharges the by-products of the rinsing operation from the heater. The discharge may be directed to a water drain or the like. The rinsing mode may last for a default length of time (e.g., 5 minutes) or other length of time programmable by the user. The programmable control module 208 monitors for the scheduled return to normal operation mode of the water heater 100.

When normal operation mode is triggered, the state of the automatic descaler 204 returns to settings illustrated in FIG. 3. That is, previously open valve 228 is closed; previously closed valve 232 is opened; valve 240 remains open; and valves 236 and 244 remain closed. The water heater 100 is now on-line to supply heated, potable water to the structure per its normal operation. The programmable control module 208 continues to monitor for a scheduled cleaning/descaling operation. Automatic cleaning/descaling operations can be scheduled as frequently or infrequently as desired by the user, or in accordance with default dates and times. Typical automatic cleaning/descaling operations might, however, occur twice a year.

Figure 6:
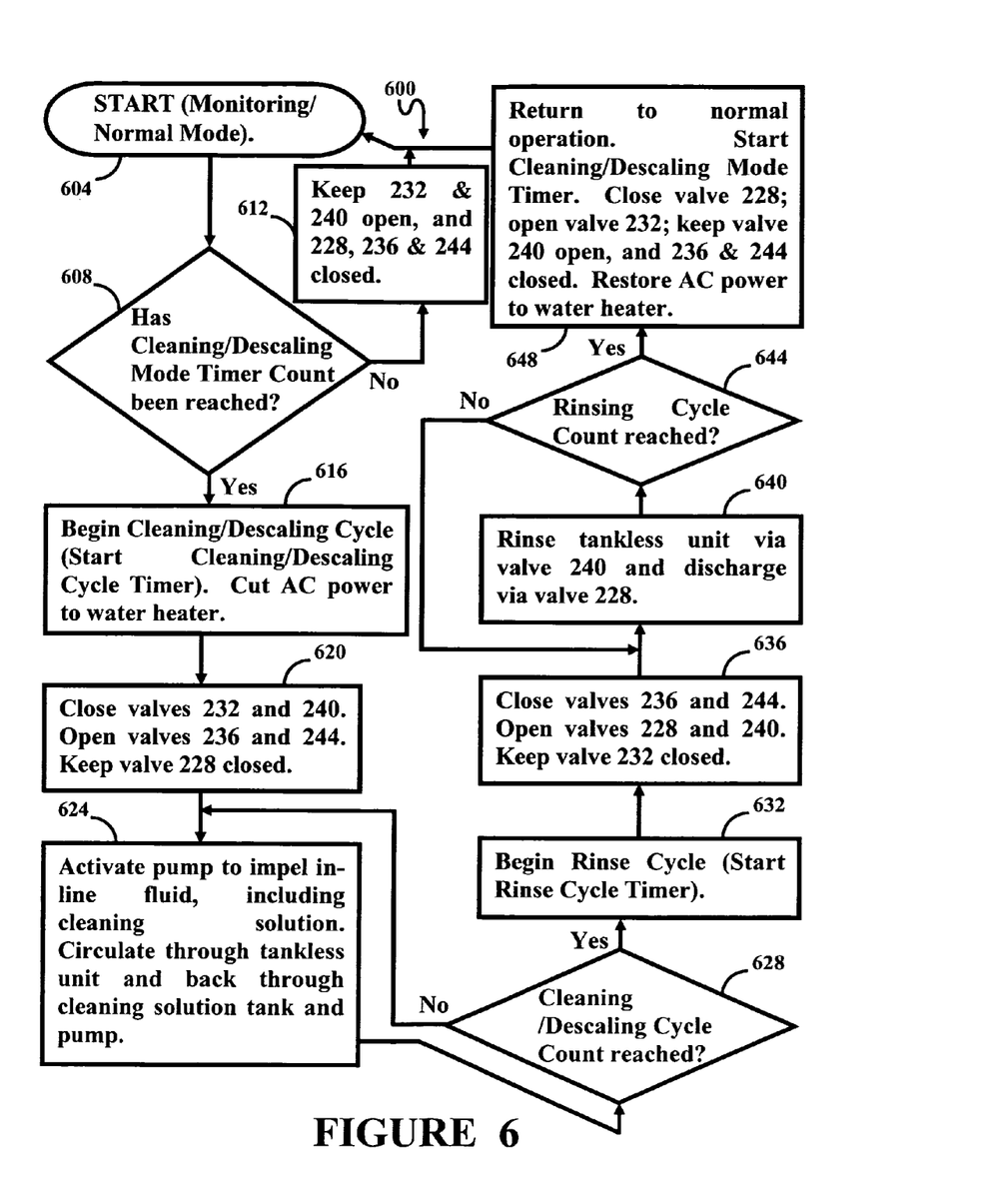
FIG. 6 is a flowchart illustrating the present-inventive automatic water heater descaling process as can be carried out by (but not limited to) the system and apparatus of FIG. 3.

Turning to FIG. 6, the present-inventive method 600 for automatic descaling of water heating units is illustrated by way of a flowchart. At the starting Step 604 of the process, the programmable control module 208 monitors a cleaning/descaling mode timer which has been programmed to provide a count up to (or down to) a moment in time representing the date and starting time for a scheduled cleaning/descaling operation. If the cleaning/descaling mode timer count has been reached, the decision Step 608 advances the process to Step 616. If not, the process is returned to Step 612 to continue to keep valves 232 and 240 open, and continue to keep valves 228, 236 and 244 closed during normal operation of the water heater.

Step 616 begins a cleaning/descaling operation and sets the value of a cleaning/decaling cycle timer (in accordance with the predetermined cleaning/descaling operation duration), which begins to count up (or down). This is followed by the closing of valves 232 and 240, and the opening of valves 236 and 244, while valve 228 remains closed (Step 620). Power to the water heater is also removed during the cleaning/descaling operation, as well as during the rinsing operation. In Step 624, the pump 216 is activated to circulate cleaning/descaling solution through the water heater and back through the automatic descaler 204. The cleaning/descaling operation continues until the stored cleaning/descaling cycle count is reached (Step 628), whereupon the process advances to Step 632.

Step 632 begins a rinsing operation and sets the value of rinsing cycle timer (in accordance with the predetermined rinsing operation duration), which begins to count up (or down). This is followed by the closing of valves 236 and 244, and the opening of valves 228 and 240, while valve 232 remains closed (Step 636). In Step 640, the water heating unit 100 is internally rinsed and discharged via valves 240 and 228 as described supra. The rinsing operation continues until the stored rinsing cycle count is reached (Step 644), whereupon the process advances to Step 648.

Step 648 returns the process to normal operation mode where the water heater supplies heated, potable water to the structure. In this step, the cleaning/descaling timer is set to a predetermined value corresponding to the next scheduled cleaning/descaling operation, and the timer is activated. Meanwhile, valve 228 is closed, valve 232 is opened, valve 240 remains open, and valves 236 and 244 remain closed. Power is also restored to the water heater. The automated process returns to the beginning Step 604.

Variations and modifications of the present invention are possible, given the above description. However, all variations and modifications which are obvious to those skilled in the art to which the present invention pertains are considered to be within the scope of the protection granted by this Letters Patent. For example, while the present-inventive automatic descaling system and method have been primarily discussed with respect to tankless water heating units, the teachings may be applied to convention tank water heating units.

What is claimed is:

1. A method of descaling a water heating unit, said water heating unit being adapted to receive unheated, potable water via a cold-side input, and adapted to output heated water to a demand destination via a hot-side output, said method comprising:
   a) operating a water heating unit in a normal mode as a default:
   b) via a programmable control module, selectively receiving a user-defined descaling operation start date and time;
   c) via said programmable control module, monitoring for an advent of the descaling operation start date and time;
   d) via said programmable control module, and upon the advent of the descaling operation start date and time, automatically shutting off a supply of heated water to the demand destination, and automatically activating a pump;
   e) via said pump, automatically pumping a stored descaling solution through said water heating unit via said cold-side input of said water heating unit and said hot-side output of said water heating unit to dislodge scale deposits from said water heating unit;

f) via said pump, automatically rinsing said water heating unit to remove dislodged scale deposits and to remove descaling solution;
g) discharging dislodged scale deposits and descaling solution from said water heating unit;
h) restoring the supply of heated water to the demand destination; and
i) returning the water heating unit to normal operation mode.

2. The method of claim 1, wherein said water heating unit is a tankless water heater.

3. The method of claim 1, further comprising:
j) automatically, operatively coupling an unheated, potable supply water to a potable water input valve, said potable water input valve also being operatively coupled to said cold-side input and operatively coupled to said pump;
k) automatically, operatively coupling the output from the hot-side to a hot water output valve, said hot water output valve being operatively coupled to said hot-side output and operatively coupled to said pump;
l) automatically forming a descaling circuit between the hot-side, the pump, the cold-side and an internal flow of the water heating unit during a descaling operation; and
m) automatically forming a rinsing circuit between the potable water input, the cold-side, the internal flow of the water heating unit, the hot-side and a rinse discharge valve during a rinsing operation.

4. The method of claim 1, further comprising:
n) automatically disabling descaling and rinsing circuits during normal operation mode.

5. The method of claim 1, further comprising:
operating the valves via operatively coupled solenoids.

6. The method of claim 5, further comprising:
energizing and de-energizing said solenoids according to signals from said programmable control module.

7. The method of claim 5, further comprising:
energizing and de-energizing said solenoids in response to an operatively coupled power relay.

8. A system for descaling a water heating unit, said water heating unit being adapted to receive unheated, potable water via a cold-side input, and adapted to output heated water to a demand destination via a hot-side output, which water heating unit operates in a normal mode as a default, said system comprising:
a pump;
a descaling solution source;
a plurality of valves;
a programmable control module operatively coupled to said pump, said descaling solution source, and said valves, said programmable control module adapted to selectively receive a user-defined descaling operation start date and time, monitor for an advent of the desealing operation start date and time, and upon the advent of the descaling operation start date and time, automatically shut off via at least one valve, a supply of heated water to the demand destination, and automatically activate said pump;
said pump adapted to automatically pump stored descaling solution through said water heating unit via said cold-side input of said water heating unit and said hot-side output of said water heating unit to dislodge scale deposits from said water heating unit, and further adapted to automatically rinse said water heating unit to remove dislodged scale deposits and to remove descaling solution; and
said programmable control module further adapted to cause said valves to discharge dislodged scale deposits and descaling solution from said water heating unit, restore the supply of heated water to the demand destination, and return said water heating unit to normal operation mode.

9. The system of claim 8, wherein said water heating unit is a tankless water heater.

10. The system of claim 8, wherein said valves further comprise:
a potable water input valve operatively coupled to an unheated, potable supply water to a potable water input valve, operatively coupled to said cold-side input, and operatively coupled to said pump; and
k) a hot water output valve operatively coupled to the output from the hot-side, and operatively coupled to said pump;
wherein said programmable control module and valves are further adapted to automatically form a descaling circuit between the hot-side, the pump, the cold-side and an internal flow of the water heating unit during a descaling operation, and said programmable control module and valves are further adapted to automatically form a rinsing circuit between the potable water input, the cold-side, the internal flow of the water heating unit, the hot-side and a rinse discharge valve during a rinsing operation.

11. The system of claim 8, wherein said programmable control module and valves are further adapted to automatically disable descaling and rinsing circuits during normal operation mode.

12. The system of claim 8, further comprising:
a solenoid operatively coupled to each said valve.

13. The system of claim 12, wherein said programmable control module is adapted to output control signals operatively coupled to said solenoids, for energizing and de-energizing said solenoids, and for opening and closing an associated valve according to a signal received.

14. The system of claim 12, further comprising:
a power relay operatively coupled to said solenoids and operatively coupled to said programmable control module, said power relay adapted to cause said solenoids to energize and de-energize in response to activation from said programmable control module.

\* \* \* \* \*